Figure 1:
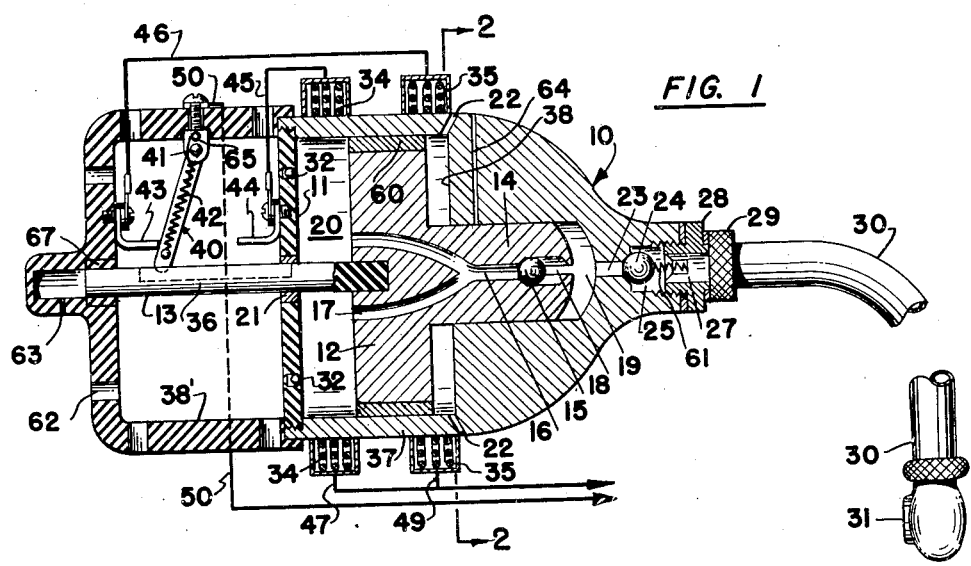

March 29, 1949.  F. S. JENKINS  2,465,688

ELECTRIC PUMP

Filed March 12, 1947

FELTON S. JENKINS
INVENTOR.

BY
Gardner J. O'Boyle
ATTORNEY

Patented Mar. 29, 1949

2,465,688

UNITED STATES PATENT OFFICE 2,465,688

ELECTRIC PUMP

Felton S. Jenkins, Philadelphia, Pa., assignor, by mesne assignments, of one-third to Anne Pryor Gates, Vienna, Va.

Application March 12, 1947, Serial No. 734,197

6 Claims. (Cl. 230—55)

This invention relates to pumps and particularly to a portable inflated mechanism electromagnetically operated.

One object of the present invention is to provide a tire inflating mechanism that may be plugged into the dash board of an automobile and actuated by electric current from the car battery. Another object is to provide such a pump with a novel arrangement for accelerating delivery of air pressure. A further object is to provide therefor automatic shut-off means actuated when an object has been inflated to a predetermined air pressure. Other objects will more plainly appear from the detailed specification and drawing herein presented in exemplification but not in limitation of the present invention. Like reference characters represent like elements in the accompanying drawings which represent diagrammatically in Fig. 1, a longitudinal cross sectional view of the device taken on the longitudinal center line thereof, Fig. 2, a horizontal cross sectional view thereof taken on the line 2—2 in Fig. 1, Fig. 3, a wiring diagram showing the preferred arrangement of the electrical connections, including the reversing switch mechanism shown in Fig. 1, Fig. 4, a diagrammatic representation of the use of the device for inflating an automobile tire.

In the past various forms of electro-magnetically operated pumps have been described for the compression or propulsion of various liquids and gases such as the device shown in U. S. Patent No. 1,830,249, issued November 3, 1931, to D. H. Spicer, but none of the prior disclosures have suggested the novel automatic quick acting tire pump that can be used in one hand and that can be readily operated on a car battery as provided by the present invention.

Figure 2:
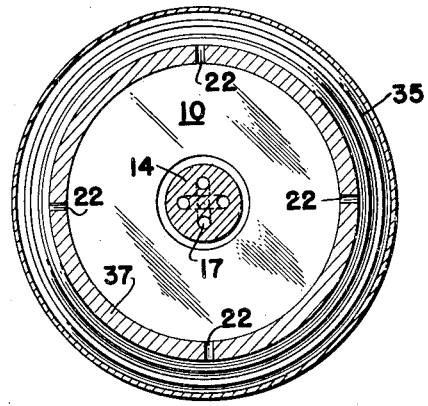

A preferred embodiment of the present invention is shown in Figs. 1 and 2 wherein a pump cylinder embodying supplemental housing 10 is provided with an extension chamber of reduced volume 19 and an intercommunicating enlarged primary chamber 20 arranged to have an air space volume up to approximately one-half greater than the air space volume of extension chamber 19, although a volume one-third greater is preferred. A piston 12, cylindrical in formation is provided with a collar 60 made of magnetic material. The rest of the device is made of relatively non-magnetic material. The piston 12 together with its collar 60 is fitted to reciprocate in primary chamber 20. Fixed to the forward end of piston 12 is a reduced piston extension 14, which is made of relatively non-magnetic material and fitted to reciprocate in extension chamber 19. The piston 12 is provided at its rearward face with the centered piston rod 13 having at its extremity a switch operating recess 36.

Extension chamber 19 is provided with the outlet passage 23 in which is placed a check valve 24 and its spring 61 operating in the recess 25 and in the passage 27 to the hose fitting 28. A flexible hose member 30 is coupled at 29 to the outlet 28 and is provided at its other end with the usual inflating valve 31 adapted to engage the usual tire valve 53 in a manner well known in the art.

The chamber 20 is provided with breathing vents 22 preferably spaced radially at four or more points in a main housing 37 at a position slightly above the seat or floor 38 of the chamber 20. This provides an air cushion at the end of the stroke of piston 12 which prevents knocking during operation.

The piston 12 is provided with a channel 16 and an outlet aperture 18 provided with a check valve 15. The branches 17 of the channel 16 are preferably radially spaced at four or more points around the rod 13, and extend rearwardly as shown in Fig. 1.

The chamber 20 is provided with the cover plate or head 11 adapted to be securely threaded into main housing 37 of the cylinder 10. The cover plate 11 is provided with a bearing fitted aperture 21 to permit the reciprocation of the rod 13 therethrough, and is supplied with check valves 32 preferably located radially around the aperture 21 at four or more points.

Arranged around the exterior face of main housing 37 are two solenoid coils 34 and 35. Attached to main housing 37 is a rear housing 38' adapted to carry the reversing switch 40 at its pivot 41. A spring 42 is attached to the switch arm 40 and to the housing 38' at 65 as shown in Fig. 1 in such a way that when the switch arm 40 is pushed over its center position by the rod 13 the spring 42 acts to urge the arm 40 onto the contact 43 or 44 depending on the direction of travel of the rod 13. The contact 44 is connected by the conduit 45 to the solenoid 34 and the contact 43 is connected by the conduit 46 to the solenoid 35. The terminal end of the solenoid 34 is connected by the conduit 47 to the car battery 48 or other source of current and in a like manner the terminal end of the solenoid 35 is connected by the conduit 49 to the battery 48 or like source. The switch arm 40 is connected by the conduit 50 to the battery 48 or similar source.

Figure 4:
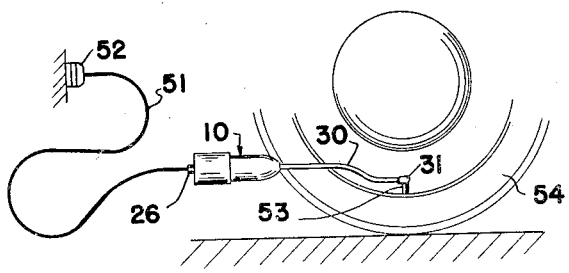

In operation the improved two-stage booster action of the present invention operates in the following manner, when for example the delivery valve 31 is engaged with the tire valve 53 as shown in Fig. 4. On the back stroke the piston 12 travels rearwardly in the chamber 20. This closes check valves 32 and forces the air that was in chamber 20 to travel through the branched channel 17 and main channel 16 past the valve 15 and into the chamber 19. This forces the check valve 15 to close at the end of the stroke. For example, in the preferred embodiment wherein the chamber 20 is approximately one-third greater in air space volume than chamber 19, the stroke just described will provide a pressure of approximately one atmosphere plus one-third in the chamber 19. During the course of the back stroke air is breathed into the chamber 20 at the rear of the piston 12 through the vents 22 which prevents the creation of any vacuum that may tend to appear behind the piston 12 as a result of its close fit against the walls 37 of chamber 20. At this point the back pressure from the tire 54 holds check valve 24 closed.

On the forward stroke the piston 12 advances and causes the air in chamber 19 to open check valve 24 and flow into the delivery hose 30. At the same time check valves 32 open and allow air to flow into and fill chamber 20 at atmospheric pressure, and concurrently air is breathed out of vents 22, thus providing for the free forward stroke of the piston 12.

For example if the chamber 20 is approximately one-third or one-half greater in air space volume than the air space volume of chamber 19, the pressure in chamber 19 on the back stroke will be approximately one-third or one-half greater than atmospheric pressure. Therefore, on the forward stroke, this novel two-stage action causes the pump of the present invention to deliver a proportionally greater air pressure per cycle on each forward stroke than by prior conventional types of pumps hitherto suggested.

The electrical characteristics of the solenoid coils 34 and 35 may be so determined and arranged that they will act to automatically cause the pump to have a maximum pressure operating capacity. For example the number of turns of wire in the coils will determine the force of the piston 12. For instance two hundred turns of No. 14 wire in each coil 34 and 35 would supply an approximate pressure limit of thirty-five pounds per square inch at the delivery aperture of the pump and into the hose 30. On the other hand No. 18 wire with two hundred turns in each solenoid 34 and 35 would reduce the force of the piston 12 so that only twenty-five pounds per square inch would be delivered to the hose 30. The foregoing examples are based on a preferred diameter of one inch for the chamber 19 and a stroke for the piston 12 not exceeding three-quarters inch.

If it is desired to use the present invention for inflating automobile tires it is apparent from the foregoing that coil characteristics may be selected that will cause the pump of the present invention to supply the maximum pressure per square inch provided by the tire. This will make the use of pressure indicators unnecessary because when the novel pump described herein is in operation the reciprocation of the piston 12 will cease as soon as the required pressure is reached in the tire. This will create a back pressure from the tire which will open check valve 24 and which will act on pistons 14 and 12 and which cannot be overcome by the pull of the coils 34 and 35 on the piston 12, through its magnetic collar 60.

Figure 3:
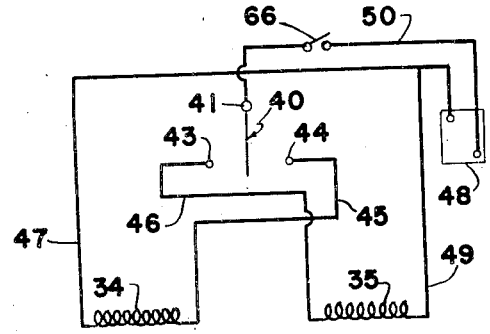

At this point the device 10 may be disconnected from the source of electricity 48 by means of a switch 66 of any well known type positioned as indicated in Fig. 3.

Vents 62 are provided in the casing 38' to permit the passage of air into the chamber 20 through the check valves 32. A small vent 63 is provided in the casing 38' in the rear of the rod 13. This provides an air cushion for the rod 13 and also affords a channel for lubricating the rod by forcing graphite or other lubricants therethrough at this point. Another lubricating channel is provided at 64 through which graphite or other lubricating material may be forced to lubricate the piston 14 in the chamber 19. Lubricating bearings 67 and 21 are also provided for the rod 13.

In Fig. 1 the conduits 45 and 46, 49 and 50 are diagrammatically shown for the purpose of clarity. In actual practice it is preferred to lead these conduits rearwardly through the casing 38' so that they would emerge at 26 as shown in Fig. 4 and there be enclosed in a cable 51 and attached to a plug 52 for connection through the dash board with the car battery 48 or other source of electric current. The hose 30 of the pump 10 is shown with its delivery valve 31 fixed to the tire valve 53 of the tire 54 in the diagram shown in Fig. 4.

The reversing switch 40 as shown in Fig. 1 is actuated by a coil spring 42, one end of which is connected to the lower end of the switch arm 40 and the other end connected to the housing 38' at a point 65 positioned above the pivot point 41 of the switch arm 40. This diagrammatic presentation is used for the sake of clarity but other resilient reversing means may also be employed. Reversing means of other types have been suggested in the past in U. S. Patents Nos. 1,804,375 to H. H. Cobe, issued May 5, 1931, and in 1,684,468 to Warren G. Brown, issued September 18, 1928.

Applicant has illustrated and described a preferred embodiment of his invention in the foregoing specification and drawing and he intends that his invention shall contemplate every embodiment and modification thereof within the spirit and scope of the appended claims.

I claim:

1. A portable air compressor; comprising in combination: air intake means; delivery means for the discharge of air under pressure; a piston containing magnetic material; a relatively non-magnetic extension fixed to and forming a continuation of said piston; main housing means providing a primary chamber in which said piston is arranged to reciprocate; supplemental housing means fixed to said main housing to provide an extension chamber forming a continuation of said primary chamber materially less in volume than said primary chamber; said piston extension being arranged to reciprocate in said extension chamber; conduit means leading through said piston and said piston extension and arranged to provide the passage of air from one to the other of said chambers; electromagnetic means for causing said piston to travel in said primary chamber; switch means actuated by the travel of said piston for reversing said travel; said switch means and said electromagnetic means being arranged in cooperating relationship to cause the reciprocation of said piston and its extension in high frequency strokes; said conduit means being arranged to coact with said piston and said piston extension to draw air into one of said chambers at the end of one stroke of said piston and thereafter deliver said air under pressure at the end of the subsequent stroke of said piston; said electromagnetic means comprising a solenoid coil around said main housing adjacent one end of said primary chamber and a like coil around said main housing adjacent the other end of said primary chamber, and electrical connector means joining said coils in cooperative relationship with said switch means.

2. The combination of claim 1 wherein said primary chamber is arranged to have an operating volume of air space within the approximate range from one third to one half greater than the operating volume of air space in said extension chamber.

3. The combination of claim 1 wherein said electromagnetic means is so arranged that its actuation of said piston will be overcome by the accumulation of a predetermined maximum air pressure at said delivery means.

4. A portable tire inflating device; comprising in combination: air intake means; delivery means for the discharge of air under pressure; a piston containing magnetic material; a relatively non-magnetic extension fixed to and forming a continuation of said piston; main housing means providing a primary chamber in which said piston is arranged to reciprocate; supplemental housing means fixed to said main housing to provide an extension chamber forming a continuation of said primary chamber materially less in volume than said primary chamber; said piston extension being arranged to reciprocate in said extension chamber; conduit means leading through said piston and said piston extension and arranged to provide the passage of air from one to the other of said chambers; electromagnetic means for causing said piston to travel in said primary chamber; switch means actuated by the travel of said piston for reversing said travel; said switch means and said electromagnetic means being arranged in cooperating relationship to cause the reciprocation of said piston and its extension in high frequency strokes; said conduit means being arranged to coact with said piston and said piston extension to draw air into one of said chambers at the end of one stroke of said piston and thereafter deliver said air under pressure at the end of the subsequent stroke of said piston; said electromagnetic means comprising a solenoid coil around said main housing adjacent one end of said primary chamber and a like coil around said main housing adjacent the other end of said primary chamber, and electrical connector means joining said coils in cooperative relationship with said switch means; means for connecting said electro-magnetic means with a source of electric current and means providing a removable operating connection between said device and the inflation valve of a tire.

5. The combination of claim 4 wherein said primary chamber is arranged to have an operating volume of air space within the approximate range of from one third to one half greater than the operating volume of air space in said extension chamber.

6. The combination of claim 4 wherein said electromagnetic means is so arranged that its actuation of said piston will be overcome by the accumulation of a predetermined maximum air pressure in said tire.

FELTON S. JENKINS.

REFERENCES CITED

The following references are of record in the file of this patent:

UNITED STATES PATENTS

| Number | Name | Date |
| --- | --- | --- |
| 1,671,007 | Body | May 22, 1928 |
| 1,925,934 | Rimstad et al. | Sept. 5, 1933 |
| 2,403,814 | Maniscalco | July 9, 1946 |

FOREIGN PATENTS

| Number | Country | Date |
| --- | --- | --- |
| 38,232 | France | Jan. 27, 1931 |